(12) United States Patent
Hannuksela et al.

(10) Patent No.: US 7,421,508 B2
(45) Date of Patent: Sep. 2, 2008

(54) PLAYBACK OF STREAMED MEDIA

(75) Inventors: Miska Hannuksela, Tampere (FI);
Emre Baris Aksu, Tampere (FI)

(73) Assignee: Nokia Corporation, Espoo (FI)

( * ) Notice: Subject to any disclaimer, the term of this patent is extended or adjusted under 35 U.S.C. 154(b) by 317 days.

(21) Appl. No.: 10/071,326

(22) Filed: Feb. 8, 2002

(65) Prior Publication Data
US 2002/0105951 A1    Aug. 8, 2002

(30) Foreign Application Priority Data
Feb. 8, 2001    (FI) .................. 20010239

(51) Int. Cl.
*G06F 15/16*    (2006.01)
(52) U.S. Cl. ............... 709/231; 709/220; 370/412; 370/503; 370/312
(58) Field of Classification Search ........... 709/231, 709/220; 370/503, 312, 412
See application file for complete search history.

(56) References Cited

U.S. PATENT DOCUMENTS

| | | | |
|---|---|---|---|
| 5,892,980 A | 4/1999 | Tal et al. ............ 395/876 |
| 6,151,359 A | 11/2000 | Acer et al. ............ 375/240 |
| 6,175,871 B1 | 1/2001 | Schuster et al. ........... 709/231 |
| 6,249,551 B1 | 6/2001 | Yamaguchi .......... 375/240.25 |
| 6,301,258 B1 | 10/2001 | Katseff et al. ............ 370/412 |
| 6,768,499 B2 * | 7/2004 | Miller et al. ............ 715/723 |
| 6,792,615 B1 * | 9/2004 | Rowe et al. ............ 725/37 |
| 6,823,394 B2 * | 11/2004 | Waldvogel et al. ......... 709/231 |
| 6,842,433 B2 * | 1/2005 | West et al. ............ 370/312 |
| 2002/0097750 A1 * | 7/2002 | Gunaseelan et al. ........ 370/503 |

FOREIGN PATENT DOCUMENTS

| | | |
|---|---|---|
| EP | 0430570 A2 | 6/1991 |
| EP | 0562221 A1 | 9/1993 |
| EP | 1146678 A1 | 10/2001 |
| HU | 223910 B1 | 12/2001 |
| JP | 8-237650 | 9/1996 |
| JP | 10-285591 | 10/1998 |

* cited by examiner

*Primary Examiner*—Nathan J. Flynn
*Assistant Examiner*—Kyung H Shin
(74) *Attorney, Agent, or Firm*—Harrington & Smith PC

(57) ABSTRACT

The invention discloses a method of improving the playback of streamed media on a client device by overcoming problems caused by variations in the transmission delay of packets due to network and transport protocol operation and variations in encoding/server specific delays. In an embodiment of the invention, a client device has a decoder (120) and a pre-decoder buffer (110) which receives streamed packets from source server via a packet network. The pre-decoder buffer is variable in size and has a variable initial buffering time for receiving the transmitted packets from the source server prior to decoding in the decoder. The initial buffering time and pre-decoder buffer size can be dynamically adapted for improved playback performance by the source server. In a further aspect of the invention, a post-decoder buffer operates in conjunction with the pre-encoder buffer to reduce decoding-related delay variations.

29 Claims, 2 Drawing Sheets

PLAYBACK OF STREAMED MEDIA

FIELD OF THE INVENTION

The present invention relates generally to the streaming of media over packet-based networks. More specifically, the invention relates a buffering mechanism for improving playback of the streamed media from packet delay variation due to encoding and packetisation.

BACKGROUND OF THE INVENTION

In conversational packet-switched multimedia systems, e.g., in IP-based video conferencing systems, different types of media are normally carried in separate packets. Moreover, packets are typically carried on top of a best-effort network protocol that cannot guarantee a constant transmission delay, but rather the delay may vary from packet to packet. Consequently, packets having the same presentation (playback) time-stamp may not be received at the same time, and the reception interval of two packets may not be the same as their presentation interval (in terms of time). Thus, in order to maintain playback synchronization between different media types and to maintain the correct playback rate, a multimedia terminal typically buffers received data for a short period (e.g. less than half a second) in order to smooth out delay variation. Herein, this type of buffer is referred to as a delay jitter buffer. In conversational packet-switched multimedia systems buffering can take place before and/or after media data decoding.

Delay jitter buffering is also applied in streaming systems. Due to the fact that streaming is a non-conversational application, the delay jitter buffer required may be considerably larger than in conversational applications. When a streaming player has established a connection to a server and requested a multimedia stream to be downloaded, the server begins to transmit the desired stream. The player typically does not start playing the stream back immediately, but rather it buffers the incoming data for a certain period, typically a few seconds. Herein, this type of buffering is referred to as initial buffering. Initial buffering provides the ability to smooth out transmission delay variations in a manner similar to that provided by delay jitter buffering in conversational applications. In addition, it may enable the use of link, transport, and/or application layer retransmissions of lost protocol data units (PDUs). Buffering allows the player to decode and play data from the buffer while allowing the possibility for lost PDUs to be retransmitted. If the buffering period is sufficiently long the retransmitted PDUs are received in time to be decoded and played at the scheduled moment.

Initial buffering in streaming clients provides a further advantage that cannot be achieved in conversational systems; it allows the data rate of the media transmitted from the server to vary. In other words, media packets can be temporarily transmitted faster or slower than their playback rate, as long as the receiver buffer does not overflow or underflow. The fluctuation in the data rate may originate from two sources. The first source of fluctuation is due to the fact that the compression efficiency achievable in some media types, such as video, depends on the contents of the source data. Consequently, if a stable quality is desired, the bit-rate of the resulting compressed bit-stream varies. Typically, a stable audio-visual quality is subjectively more pleasing than a varying quality. Thus, initial buffering enables a more pleasing audio-visual quality to be achieved compared with a system without initial buffering, such as a video conferencing system.

Considering the example of video data in more detail, different frames of a video sequence may be represented by very different amounts of data. This results from the use of predictive encoding techniques. Typically, video encoding standards define at least two types of frame. The principal frame types are INTRA or I-frames and INTER or P-frames. An INTRA frame is encoded on the basis of information contained within the image itself, while a P-frame is encoded with reference to at least one other frame, usually a frame occurring earlier in the video sequence. Due to the significant temporal redundancy between successive frames of a digital video sequence, it is possible to encode an INTER frame with a significantly smaller amount of data than that required to represent an INTRA frame. Thus, INTRA frames are used comparatively infrequently in an encoded video sequence.

Typically an encoded sequence starts with an INTRA frame (as there is no previous frame available to be used as a reference in the construction of an INTER frame). INTRA frames may be inserted into the sequence periodically e.g. at regular intervals, in order to compensate for errors that may accumulate and propagate through a succession of predicted (INTER) frames. INTRA frames are also commonly used at scene cuts where the image content of consecutive frames changes so much that predictive coding does not provide effective data reduction. Thus, a typical encoded video stream generally starts with an INTRA coded frame and comprises a sequence of INTER frames interspersed with occasional INTRA frames, the amount of data required to represent an INTRA frame being several (e.g. 5-10) times greater than that required to represent an INTER coded frame. The amount of data required to represent each INTER frame also varies according to the level of similarity/difference with its reference frame and the amount of detail in the image.

This means that the information required to reconstruct a predictively encoded video sequence is not equally distributed amongst the transmitted data packets. In other words, a larger number of data packets is required to carry the data related to an INTRA frame than is required to carry the data for an INTER frame. Furthermore, as the amount of data required to represent consecutive INTER frames also varies depending on image content, the number of data packets required to carry INTER frame data also varies.

A second source of fluctuation occurs when packet losses in fixed IP networks occur in bursts. In order to avoid bursty errors and high peak bit- and packet-rates, well-designed streaming servers schedule the transmission of packets carefully and packets may not be sent precisely at the rate they are played back at the receiving end. Typically, network servers are implemented in such a way that they try to achieve a constant rate of packet transmission. A server may also adjust the rate of packet transmission in accordance with prevailing network conditions, reducing the packet transmission rate when the network becomes congested and increasing it if network conditions allow, for example. This typically occurs by adjusting the advertised window of the acknowledgement message sent in TCP (transmission control protocol).

Considering this embedded property of network servers, and in connection with the previously described video encoding system, not only is the information required to reconstruct a predictively encoded video sequence unequally distributed between the transmitted data packets, but the data packets themselves may also be transmitted from the server at a varying rate. This means that a decoder in, for example, a receiving client terminal experiences a variable delay in receiving the information that it requires to construct consecutive frames in a video sequence even if the transmission delay through the network is constant. It should be noted that the term client terminal refers to any end-user electronic device such as handheld devices (PDAs), wireless terminals, as well as desktop and laptop computers and set top boxes, This variation in delay, which arises due to encoding, packetisation and packet transmission from a server can be termed an "encoding" or "server-specific" variation delay. It is independent of, or in addition to, delay jitter that arises due to variations in transmission time within the network.

Hence, initial buffering enables the accommodation of fluctuations in transmitted data rate from the aforementioned disadvantages i.e. encoding or server-specific delay variation and network transmission related delay variation. Initial buffering helps to provide a more stable audio-visual quality and to avoid network congestion and packet losses.

Initial buffering may also be performed after decoding of the received media data. This has the disadvantage that the dimensions of the buffer must be relatively large, as the buffering is performed on decoded data. The combined effect of encoding, server-specific and network transmission delay variations also tends to increase the initial buffering requirement.

Furthermore, the encoding of media data and the way in which encoded data is encapsulated into packets and transmitted from a server causes a decoder in a receiving client terminal to experience a variable delay in receiving the information it requires to reconstruct the media data, even if the transmission delay through the network is constant. Thus, a post-decoder buffer does not provide a means of absorbing this form of delay variation prior to decoding.

SUMMARY OF THE INVENTION

According to a first aspect of the invention there is a method of streaming media data by transmitting a plurality of data packets over a network from a source server to a client device wherein the client device includes a decoder for decoding encoded packets. The method is characterised in that the client device further includes a pre-decoder buffer having a variable initial buffering time and a variable buffer size established for receiving the transmitted data from the source server prior to decoding in the decoder, and wherein the variable initial buffering time and variable buffer size of the pre-decoder buffer are dynamically adapted for improved playback performance by the client device.

According to a second aspect of the invention there is provided a system for streaming media data by transmitting a plurality of data packets, the system including a source server hosting the media data, a network serving as a transmission medium for the data packets; and a client device capable of playing back the media data, wherein the client device includes a pre-decoder buffer for receiving the transmitted packets from the source server via the network, the pre-decoder buffer having a variable initial buffering time and a variable buffer size, a decoder for decoding the packets from the pre-decoder buffer and means for dynamically adapting the variable initial buffering time and the variable buffer size of the pre-decoder buffer for improved playback performance by the client device.

According to a third aspect of the invention there is provided a client device for receiving a plurality of data packets transmitted over a network from a source server, the client device including a pre-decoder buffer for receiving the transmitted data packets from the source server via the network, the predecoder buffer having a variable initial buffering time and a variable buffer size, a decoder for decoding the data packets from the pre-decoder buffer, and means for dynamically adapting the variable initial buffering time and the variable buffer size of the pre-decoder buffer for improved playback performance by the client device.

BRIEF DESCRIPTION OF THE DRAWINGS

The invention, together with further objectives and advantages thereof, may best be understood by reference to the following description taken in conjunction with the accompanying drawings in which.

DETAILED DESCRIPTION OF THE INVENTION

Architectural Overview

According to the invention, a new buffering block is provided in the terminal architecture in order to provide improved receiver-side buffering. This buffering block is herein referred to as a pre-decoder buffer.

Figure 1:
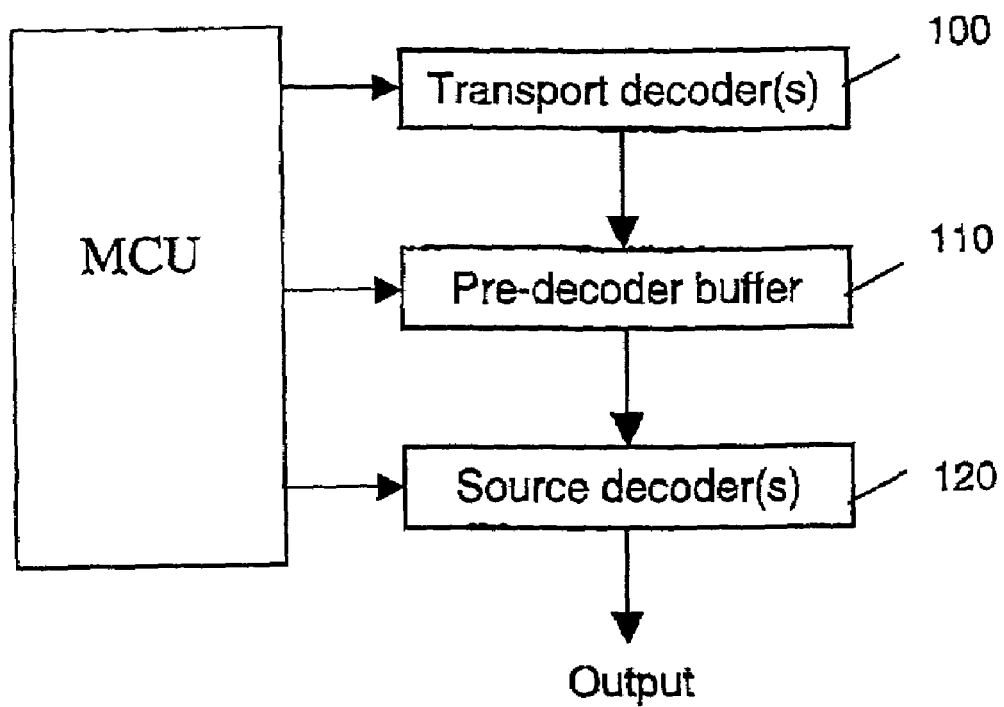
FIG. 1 shows a simplified block diagram of a pre-decoder buffer block in the device terminal architecture, in accordance with an embodiment of the invention.

FIG. 1 shows a simplified block diagram of a pre-decoder buffer block in the device terminal architecture, in accordance with an embodiment of the invention. The "Transport decoder" 100 decapsulates the code-stream from the received data packets (e.g. RTP data packets). The "Source decoder" 120 decodes the code-stream to an uncompressed data format that can be played back. The "Pre-decoder buffer" 110 operates as a temporary storage between transport decoding and source decoding. In the case of a multi-media data stream comprising more than one type of data, a common pre-decoder buffer is advantageously shared between all real-time media types that are transmitted. However, in alternative embodiments of the invention, a separate pre-decoder buffer is provided for each media type, the pre-decoder buffer for each media type being located between the transport decoder and the respective source decoder for the media type in question. The decoding operations, are preferably implemented as software stored in the memory of the client device and run by and under the control of a MCU (Master Control Unit) that controls the operation of the client device, of which FIG. 1 shows a part. The MCU receives control signals from a source server and controls the adaptation of the initial buffering time and the buffer size according to the received signals from the source server. The control of the different blocks by the MCU is illustrated in FIG. 1 by the control arrows from the MCU to each block.

In a preferred embodiment of the invention, the pre-decoder buffer is provided in addition to a post-decoder buffer located after a decoder in a streaming client. Advantageously, the post-decoder buffer is provided in order to absorb network transmission delay variations. Additionally, the post-decoder buffer can also absorb decoding-related delay variations. This is particularly advantageous in the case where more than one type of media data is streamed simultaneously. The use of a post-decoder buffer in this situation enables decoding delay variations introduced by different media decoders to be smoothed out. In an alternative embodiment of the invention, a separate decoder buffer is also provided in the receiving client. The decoder buffer is located between the decoder and the post-decoder buffer and is provided as a temporary store for media data as it is decoded. Advantageously, in a situation in which more than one type of media data is streamed simultaneously, a separate decoder buffer is provided for the respective source decoder for each media type.

Buffering Algorithm

A buffering algorithm operating in accordance with the embodiment is provided to buffer received data in a streaming client and to control the encoding and serving of streams from a network-based streaming server. The algorithm assumes that a pre-decoder buffer according to the invention is provided in the streaming client.

There are two primary factors that affect the behavior of the buffering algorithm i.e. the initial buffering time and the minimum pre-decoder buffer size. The initial buffering time typically refers to the time that elapses between the time when a first media data packet is received and the time when the first media sample is played back. The minimum pre-decoder buffer size typically corresponds to the amount of data (e.g. the number of bytes of data) the streaming client is able to store in addition to the buffering that takes place to cope with the transmission delay variation. In other words, a minimum pre-decoder buffer size is defined for zero-delay reliable transmission networks.

The buffering algorithm is similar to the algorithms described in H.263 Annex B (Hypothetical Reference Decoder) and MPEG-4 Visual Annex D (Video buffering verifier). These algorithms define the buffering behavior for video codecs. It should be noted that these algorithms cannot be used to replace the proposed pre-decoder buffering algorithms, because they are applicable to video only. Moreover, the H.263 Hypothetical Reference Decoder does not support initial buffering or storing of multiple (non-B) frames into the buffer. It should also be noted that the proposed pre-decoder buffering algorithm is fully compatible with the previously mentioned video buffering algorithms. In a practical implementation, the pre-decoder buffer and the video decoder buffer can be combined.

In accordance with the preferred embodiment of the invention, the buffering algorithm constrains a transmitted data packet stream to comply with the requirements of the pre-decoder buffer which are defined as follows:

1. The pre-decoder buffer is initially empty.
2. Each received data packet is added to the pre-decoder buffer substantially immediately it is received. All protocol headers at the transmission protocol level (e.g. RTP layer) or any lower layer are removed.
3. Data is not removed from the pre-decoder buffer during a period called the initial buffering time that is started when the first data packet is added to the buffer.
4. When the initial buffering time has expired, a playback timer is started.
5. A data chunk is removed from the pre-decoder buffer substantially immediately when the playback timer reaches the scheduled playback time for the data chunk in question.
6. When the data is carried over a zero-delay reliable transmission network, the occupancy level of the pre-decoder buffer is not permitted to exceed a certain level called the pre-decoder buffer size.

It should be noted that the requirements above describe the operation without intermediate pause requests. Each new play request (after a pause, for example) will follow the same requirements.

Furthermore, the requirements above are based on the assumption of having a zero-delay reliable transmission network, Thus, in a practical implementation, client-side pre-decoder buffering is likely to be combined with network delay jitter buffering. Consequently, the actual pre-decoder buffer size in a streaming client is likely to be larger than the minimum pre-decoder buffer size discussed above, and the actual initial buffering time is also likely to be longer than the initial buffering time discussed above.

Pre-Decoder Buffering

Figure 2:
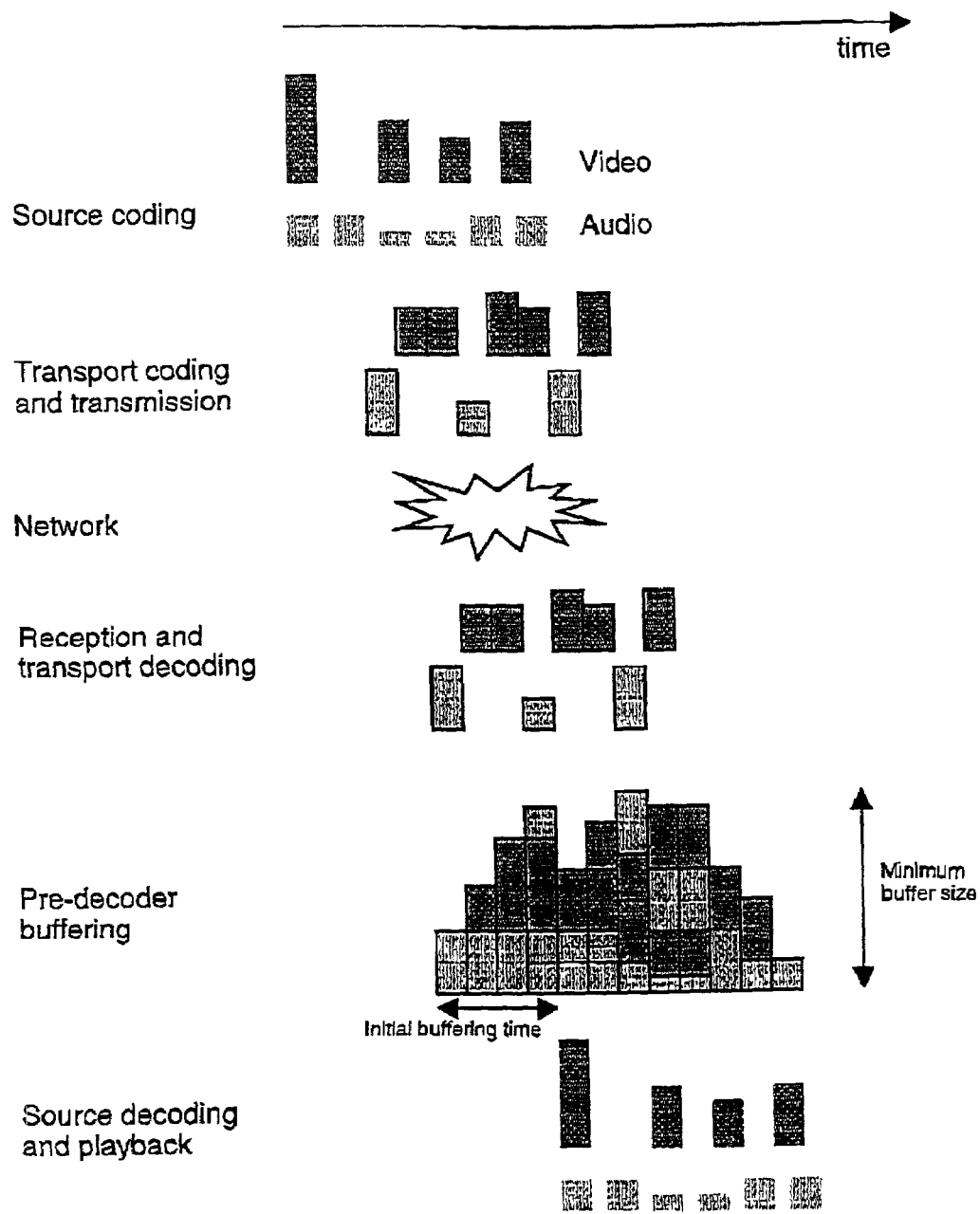
FIG. 2 shows an example of a data flow in a typical streaming system illustrating the effect of pre-decoder buffering.

FIG. 2 shows an example of a data flow in a typical streaming system illustrating the effect of pre-decoder buffering. The bars represent media frames or packets, for example, the dark bars are video data packets (e.g. encoded according to ITU-T recommendation H.263) and the light bars are audio data packets (e.g. encoded using the Adaptive Multi-Rate (AMR) speech codec). The height of the bars represent the size of a frame (or a packet) in bytes. The processing flow runs from the top to the bottom, and time runs from left to right.

Now referring to FIG. 2 in more detail, at first, the input data is encoded. As a result, the video stream has a varying frame rate and frame size, and the audio stream has a constant frame rate but a varying frame size. Next the compressed media streams are encapsulated into packets and transmitted to the network. While encapsulating, the server splits large video frames to multiple packets, and combines a number of small audio frames into one packet. The server transmits packets at regular intervals. A constant network transmission delay is assumed, regardless of the packet size or any other factors. Thus, the relative timing of received packets is the same as when they were sent. The received packets are stored in a pre-decoder buffer. After a certain initial buffering time, frames are retrieved from the buffer, and the frame removal rate is the same as the frame playback rate. The maximum buffer occupancy level determines the minimum pre-decoder buffer size, Signaling of Pre-Decoder Buffer Characteristics In order to ensure certain minimum buffering capabilities in streaming clients, certain default buffer characteristics are defined. As described earlier, the buffer characteristics can be defined primarily by two factors i.e., the initial buffering time and the minimum pre-decoder buffer size. An example for the default value for the initial buffering time is approximately one second and the default minimum pre-decoder buffer size is about 30720 bytes. It should be noted that these values are only exemplary and they may be varied to achieve suitable performance for the particular type of delays experienced in the network at the time. The suggested default values are based on practical experiments in a generalized environment that are in no way specific but take into account the most commonly occurring packet transmission scenarios. It should also be noted that in a given streaming system the default pre-decoder initial buffering time and the default pre-decoder buffer size may be defined implicitly, In other words, the source server and streaming clients in the network operate in such a way that certain default pre-decoder buffer parameters (e.g. pre-decoder initial buffering time and/or pre-decoder buffer size) are assumed. In alternative embodiments, explicit signaling of the pre-decoder buffer parameters is used.

In order to allow a streaming client to signal its default pre-decoder buffering capabilities to a source server and to enable it to receive media streams requiring more demanding buffering capabilities than the default capabilities, signaling based on the SET_PARAMETER method of the Real Time Streaming Protocol (RTSP) is used in the invention.

By way of example, the client terminal device can request the server to set either one or both of the following parameters:
1. initialBufferingTimeInMSec (initial buffering time in milliseconds)
2. preDecoderBufferSizeInBytes (minimum pre-decoder buffer size in bytes)

The client terminal device is not permitted to signal parameter values smaller than the default values defined or implicitly assumed in the streaming system. A server that receives a request indicating a value smaller than one of the default values may signal a "Bad Request". If the transmitted values are greater than or equal to the defined or implicit default values, the signaled values are taken into use substantially immediately the request is received and the source server verifies the transmitted packet stream using the signaled values according to the previously described buffering algorithm. In other words, and as described in greater detail below, the server transmits the packet stream in such a way that it can be played back in a substantially correct manner at the receiving client. More specifically, the source server transmits the packet stream so as to ensure that over-flow of the pre-decoder buffer in the receiving client does not occur and that all data chunks (e.g. frames) of the media data are available for playback in the receiving client at their scheduled playback times.

According to an advantageous embodiment of the invention, when a client terminal device first establishes communication with a network server and starts to set up a streaming session with the server by requesting certain media content to be streamed, it signals its default pre-decoder buffering parameters to the server. As explained above, according to the invention, the client terminal device may either indicate its default pre-decoder buffering time or its minimum pre-decoder buffer size, or both the aforementioned parameters. In an alternative embodiment, in which the client terminal device is also provided with a post-decoder buffer, the post-decoder buffer size may be indicated to the source server. In embodiments of the invention in which the pre-decoder buffer parameters are defined implicitly in the streaming system, initial signaling of pre-decoder buffer parameters by the client device is strictly unnecessary. However, if a particular client device has pre-decoder buffering capabilities superior to the implicitly defined default values assumed in the streaming system, it can signal those to the server. In a further alternative arrangement, the source server retrieves the pre-decoder buffer parameters for a given client device from a capability server in connection with the streaming system.

The server next indicates to the client terminal device the characteristics of the media streams it can provide. As is well known to those of ordinary skill in the art, in many practical streaming systems, a streaming server is provided with a plurality of pre-encoded media streams representing the same media content. Each of the pre-encoded streams is encoded with different encoding parameters. This arrangement enables the media content to be streamed to a plurality different client terminal devices having different properties and/or capabilities and/or via networks having different characteristics (e.g. maximum available transmission bit-rate).

According to the advantageous embodiment of the invention, once the server has received an indication of the client terminal's default pre-decoder initial buffering time and/or its minimum pre-decoder buffer size, it informs the client terminal, by means of signaling via the network, of the different pre-encoded media streams it can provide. For example, if the server has 4 differently encoded media streams relating to the requested media content and the client has indicated both its default pre-decoder initial buffering time and its default pre-decoder buffer size, the server signals the pre-decoder initial buffering time and pre-decoder buffer size required to ensure correct (e.g. pause-free) playback of the 4 different media streams. The client terminal then selects one of the 4 pre-encoded media streams for playback and adjusts its pre-decoder initial buffering time and pre-decoder buffer size according to the corresponding requirements of the chosen media stream. The adjustment within the client terminal is preferably controlled by the MCU of the client terminal. If the server indicates only the required pre-decoder initial buffering time or the required pre-decoder buffer size required by the various encoded media streams, the client terminal selects the media stream on that basis and adjusts either its pre-decoder initial buffering time or pre-decoder buffer size accordingly. In this case, whichever parameter is not indicated is assigned a default value.

The client terminal then signals its choice of media stream to the server so that streaming download of the media content can commence. This step also informs the server implicitly of the pre-decoder initial buffering time and/or pre-decoder buffer size now valid in the client terminal and enables the server to correctly verify the transmitted media stream according to the previously described buffering algorithm, so that overflow of the pre-decoder buffer does not occur and all data chunks of the media data are available for playback in the receiving client at their scheduled playback times.

By enabling the client terminal to adjust its pre-decoder initial buffering time and/or pre-decoder buffer size, the method according to the invention enables the terminal to receive and correctly reproduce media streams encoded in such a way that they would not be capable of correct reproduction using the default pre-decoder buffer parameters.

According to the preferred embodiment of the invention, the pre-decoder initial buffering time and/or pre-decoder buffer size in the client are adapted according to the previously described process whenever streaming of a new media stream is initiated. If it is determined during the process that the new media stream can be played back correctly at the client using the currently valid pre-decoder buffering parameters, no adjustments are necessary. Additionally, the client may adjust its pre-decoder initial buffering time and/or pre-decoder buffer size in a situation where the server signals a change in required pre-decoder buffer parameters during an existing streaming session. This situation may arise, for example, if different consecutive sections of the media content to be streamed are encoded differently, giving rise to a need for different pre-decoder buffering at the client to ensure correct playback of the stream.

In summary, the present invention contemplates a pre-decoder buffer as a part of a streaming client. The streaming client operates by following a buffering algorithm in which a streaming server verifies that the transmitted data stream complies with the defined buffering algorithm. Additionally, the invention proposes mechanisms for defining and signaling the buffer capabilities of a streaming client to a streaming server. In this way a streaming server can obtain information about the buffering capabilities of a given streaming client and the encoded data/media transmission rate can be allowed to vary within the limits of the receiver-side pre-decoder buffer. It should be noted that a buffering verifier in a server can be used to ensure that the transmitted packet stream complies with the receiver buffering capabilities. This can be done, for example, by adjusting the transmission times of packets from the server so that the buffering capabilities of the client's pre-decoder buffer are not exceeded Alternatively, the server may adjust the way in which media data is encoded and packetised. In practice, the buffering verifier can be a buffer running within the server after the transport encoder.

Although the invention has been described in some respects with reference to a specified embodiment thereof, variations and modifications will become apparent to those skilled in the art. It is therefore the intention that the following claims not be given a restrictive interpretation but should be viewed to encompass variations and modifications that are derived from the inventive subject matter disclosed.

The invention claimed is:

1. A method for streaming media data, the method comprising:
   receiving information indicative of a client's pre-decoder buffering parameters, the received information indicative of at least one of the pre-decoder initial buffering time and the minimum pre-decoder buffer size;
   sending information indicative of a pre-decoder buffering parameter for the media data;
   sending information indicative of a post-decoder buffering parameter for the media;
   adapting the transmission of a plurality of data packets as a data packet stream to ensure that,
   the data packet stream transmitted complies with a buffering algorithm, behavior of the buffering algorithm being affected by the pre-decoder buffer parameters for the media data.

2. The method of claim 1, wherein the received information indicates at least one of a default pre-decoder initial buffering time and a default minimum pre-decoder buffer size.

3. The method of claim 1, comprising:
   sending a plurality of pre-decoder buffering parameters to ensure correct playback of a plurality of pre-encoded media streams representative of the same media content; and
   receiving an information indicative of the pre-decoder buffering parameters for the selected pre-encoded media stream.

4. The method of claim 1, wherein the information is sent during a streaming session.

5. The method of claim 1, further comprising:
   adjusting the transmission times of data packets in order to ensure that the transmitted data packet stream does not exceed the buffering capabilities of the pre-decoder buffer in the client.

6. The method of claim 1, comprising:
   receiving information indicative of the client's post-decoder buffer parameters.

7. A method according to claim 1, wherein the pre-decoder buffering parameters for the client is received from a capability server.

8. A method according to claim 1, further comprising:
   adjusting the way in which the media data is encoded and packetized in order to ensure that the transmitted data packet stream does not exceed the buffering capabilities of the pre-decoder buffer in the client.

9. A client device for receiving media data, the media data being received at the client device as a data packet stream, the client device comprising:
   a source decoder;
   a controller for sending information indicative of a client's pre-decoder buffering parameters, the information indicative of at least one of the pre-decoder initial buffering time and the pre-decoder buffer size; receiving information indicative of a pre-decoder buffering parameter for the media data; and receiving information indicative of a post-decoder buffering parameter for the media;
   a pre-decoder buffer coupled to the source decoder for buffering the media data temporarily prior to decoding in the source decoder;
   wherein the client device is arranged to buffer the media data in the pre-decoder buffer in accordance with a buffering algorithm, behavior of the buffering algorithm being affected by the pre-decoder initial buffering time and the minimum pre-decoder buffer size; and
   a post-decoder buffer coupled to the source decoder for buffering the media data after decoding.

10. A client device according to claim 9, wherein the sent information indicates at least one of a default pre-decoder initial buffering time and a default minimum pre-decoder buffer size.

11. A client device according to claim 9, wherein the client device is arranged to adjust its pre-decoder initial buffering time responsive to a received indication of a required pre-decoder initial buffering time.

12. A client device according to claim 9, wherein the client device is arranged to adjust its pre-decoder buffer size responsive to a received indication of a required pre-decoder buffer size.

13. A client device according to claim 9, wherein the client device is arranged to:
    receive information indicative of a plurality of at least one of a pre-decoder initial buffering time and a pre-decoder buffer size required to provide correct play-back of a plurality of different pre-encoded media streams representative of the same media content;
    select one of the different pre-encoded media streams for playback at the client device; and
    adjust its pre-decoder initial buffering time and pre-decoder buffer size according to the requirements of the selected media stream.

14. A client device according to claim 9, wherein the client device is arranged to adjust at least one of its pre-decoder initial buffering time and its pre-decoder buffer size responsive to a change in required pre-decoder buffer parameters received during a streaming session.

15. A server for streaming media data, the server comprising:
    a controller for receiving information indicative of a client's pre-decoder buffering parameters, the information indicative of at least one of the pre-decoder initial buffering time and the minimum pre-decoder buffer size; sending information indicative of a pre-decoder buffering parameter for the media data; sending information indicative of a post-decoder buffering parameter for the media; adapting the transmission of a plurality of data packets as a data packet stream to verify that the data packet stream transmitted complies with a buffering algorithm, behavior of the buffering algorithm being affected by the pre-decoder buffering parameters for the media data.

16. A server according to claim 15, wherein a default pre-decoder initial buffering time and a default minimum pre-decoder buffer size are defined for the pre-decoder buffer and the server is arranged to verify the transmitted data packet stream according to the buffering algorithm using said default values.

17. A server according to claim 16, wherein the server is arranged to receive signaling indicative of at least one of a default pre-decoder initial buffering time and a default minimum pre-decoder buffer size in connection with setting up a streaming session.

18. A server according to claim 16, wherein the received information indicates at least one of a default pre-decoder initial buffering time and a default minimum pre-decoder buffer size.

19. A server according to claim 15, wherein the server is arranged to retrieve pre-decoder buffering capabilities for the client device from a capability server.

20. A server according to claim 15, wherein the server is provided with a plurality of different pre-encoded media streams representative of the same media content, and is arranged to signal at least one of a pre-decoder initial buffering time and a pre-decoder buffer size required to ensure correct play-back of each available pre-encoded media stream.

21. A server according to claim 15, wherein the server is arranged to signal a change in required pre-decoder buffer parameters during a streaming session.

22. A server according to claim 15, wherein the server is arranged to adjust the transmission times of data packets in order to ensure that the transmitted data packet stream does not exceed the buffering capabilities of the pre-decoder buffer in the client.

23. A server according to claim 15, wherein the server is arranged to adjust the way in which the media data is encoded and packetised in order to ensure that the transmitted data packet stream does not exceed the buffering capabilities of the pre-decoder buffer in the client.

24. A method for buffering media data in a client device, the media data being received at the client device as a data packet stream, the client device comprising a pre-decoder buffer for buffering the media data temporarily before decoding, the method comprising:
  sending information indicative of the client's pre-decoder buffering parameters, the information indicative of at least one of the pre-decoder initial buffering time and the minimum pre-decoder buffer size;
  receiving information indicative of a pre-decoder buffering parameter for the media data;
  receiving information indicative of a post-decoder buffering parameter for the media data; and
  buffering the media data in the pre-decoder buffer of the client device in accordance with a buffering algorithm, behavior of the buffering algorithm being affected by the pre-decoder initial buffering time and the minimum pre-decoder buffer size.

25. A method according to claim 24, wherein the sent information indicates at least one of a default pre-decoder initial buffering time and a default minimum pre-decoder buffer size.

26. A method according to claim 24, further comprising:
  adjusting pre-decoder initial buffering time responsive to an indication of a received required pre-decoder initial buffering time.

27. A method according to claim 24, further comprising:
  adjusting pre-decoder buffer size responsive to an indication of a received required pre-decoder buffer size.

28. A method according to claim 24, further comprising:
  receiving information indicative of a plurality of at least one of a pre-decoder initial buffering time and a pre-decoder buffer size required to provide correct play-back of a plurality of different pre-encoded media streams representative of the same media content;
  selecting one of the different pre-encoded media streams for playback at the client device; and
  adjusting the pre-decoder initial buffering time and pre-decoder buffer size of the pre-decoder buffer according to the requirements of the selected media stream.

29. A method according to claim 24, wherein the client device adjusts at least one of its pre-decoder initial buffering time and its pre-decoder buffer size responsive to a change in required pre-decoder buffer parameters received during a streaming session.

* * * * *